United States Patent [19]

Fujita

[11] 4,447,041

[45] May 8, 1984

[54] DEVICE FOR LIFTING A TABLE

[75] Inventor: Hiromu Fujita, Kyoto, Japan

[73] Assignee: Osaka Taiyo Co., Ltd., Osaka, Japan

[21] Appl. No.: 523,906

[22] Filed: Aug. 17, 1983

Related U.S. Application Data

[63] Continuation of Ser. No. 282,645, Jul. 13, 1981, abandoned, which is a continuation of Ser. No. 84,859, Oct. 15, 1979, abandoned.

[51] Int. Cl.[3] .................................................. B60P 1/48

[52] U.S. Cl. .................................... 254/9 R; 254/122

[58] Field of Search ................. 254/9 R, 9 B, 9 C, 88, 254/93 H, 122; 187/18; 182/141, 157, 158, 69

[56] References Cited

U.S. PATENT DOCUMENTS 1,345,564 7/1920 Thomas .
2,471,901 5/1949 Ross .
2,863,285 2/1957 Pomeroy .
2,945,551 7/1960 Annin et al. .......................... 187/18
3,863,890 2/1975 Ruffing .
4,041,799 8/1977 Teti .
4,175,644 11/1979 Sikli .................................... 182/141
4,194,723 3/1980 Grove et al. .

*Primary Examiner*—Robert C. Watson
*Attorney, Agent, or Firm*—Armstrong, Nikaido, Marmelstein & Kubovcik

[57] ABSTRACT

A device including a stretchable assembly (2) of pairs of intersecting arms (3) and (4) pivoted to each other at the intersections for raising or lowering a table (5) mounted on the upper ends of the arms. The stretchable assembly (2) is vertically expandable or collapsible by a unit (6) of a cylinder (61) for advancing or retracting a piston rod (62), a pump (63) and an oil tank (66) mounted on a base plate (7) and fixed to a frame (1) at the lower end of the stretchable assembly (2). The piston rod (62) extends substantially upward from the cylinder (61) and is connected at its forward end to lower portions of the arms (3). The piston rod (62) intersects the arms (3) substantially at right angles thereto when the stretchable assembly (2) is in its collapsed position.

1 Claim, 6 Drawing Figures

DEVICE FOR LIFTING A TABLE

This application is a continuation of application Ser. No. 282,645, filed July 13, 1981, which is a cont. of Ser. No. 084,859, filed Oct. 15, 1979, both abandoned.

The present invention relates to a device for lifting a table.

An example of a known device is shown in FIG. 5, and includes a stretchable assembly 2 comprising pivotable arms 3 each pivoted to one end of a frame 1 and shiftable arms 4 each having a roller 41 slidable along a guide portion 11 of the frame 1. A table 5 is mounted on the stretchable assembly 2. A hydraulic cylinder 61, pivoted at its base end to the other end of the frame 1, has a piston rod 62 connected to the pivotable arms 3.

With the lifting device described above, the piston rod 62, when advanced or retracted, expands or collapses the stretchable assembly 2 to raise or lower the table 5. When lowering the table 5, the cylinder 61 slowly falls down toward a horizontal position into the frame 1 while retracting the piston rod 62. Thus the devices have the advantage that the distance between the lowermost position of the table 5 and the floor is small.

The force of the cylinder 61 required for raising the table 5 will be discussed. As seen in FIG. 6, the force F of the cylinder acting in the direction of advance of the piston rod 62 can be resolved into a force for turning the pivotable arms 3, namely a component $F_1$ acting in the direction of a tangent to the circular path of movement of the point 30 where the piston rod 62 is pivoted to the arms 3, and a component $F_2$ pushing the pivotable arms 3 toward their base ends. As the piston rod 62 approaches a position parallel to the frame 1, a larger proportion of the cylinder force F acts to push the pivotable arms 3 towards the base ends, with the result that the force F of the cylinder 61 can not be effectively used for turning the pivotable arms 3. Accordingly in order to obtain a great component $F_1$ for upwardly turning the pivotable arms 3 to raise the table 5 from its lower-most position, the cylinder 61 must have a force F which is exceedingly greater than the component $F_1$. This invariably necessitates the use of a large cylinder, while the pedal-type pump 63 for feeding working oil to the cylinder 61 must be operated by a greater force.

The illustrated lifting device is equipped with a hydraulic assembly 6 in which the above-mentioned pump 63 and an oil tank 66 are fixedly mounted on the frame 1 and are connected by pressure-resistant hoses to the hydraulic cylinder 61 attached to the frame 1 and the pivotable arms 3. Because of this arrangement, the distance between the point where the cylinder 61 is attached to the frame 1 and the point where the cylinder is pivoted to the arms 3 varies with the size of the table lifting device, thus giving rise to the necessity of using hydraulic cylinders of varying sizes for different lifting devices. For the manufacture of various table lifting devices, therefore, there is the need to prepare hydraulic assemblies of different sizes which can not be standardized and are expensive.

In view of the above problems, according to an aspect of the present invention there is provided a lifting device comprising a hydraulic ram, a first, pivotally mounted arm to which the ram is connected and which can be pivoted by operating the ram, and a second arm pivotally mounted to the first arm, the first and second arms forming an assembly for supporting a member which can be lifted or lowered by operating the ram to pivot the arms and thereby cause the assembly to expand or collapse, wherein the stroke of the ram is substantially at right angles to said first arm when the assembly is collapsed.

Embodiments of the present invention will now be described by way of example with reference to the accompanying drawings, in which.

Figure 1:
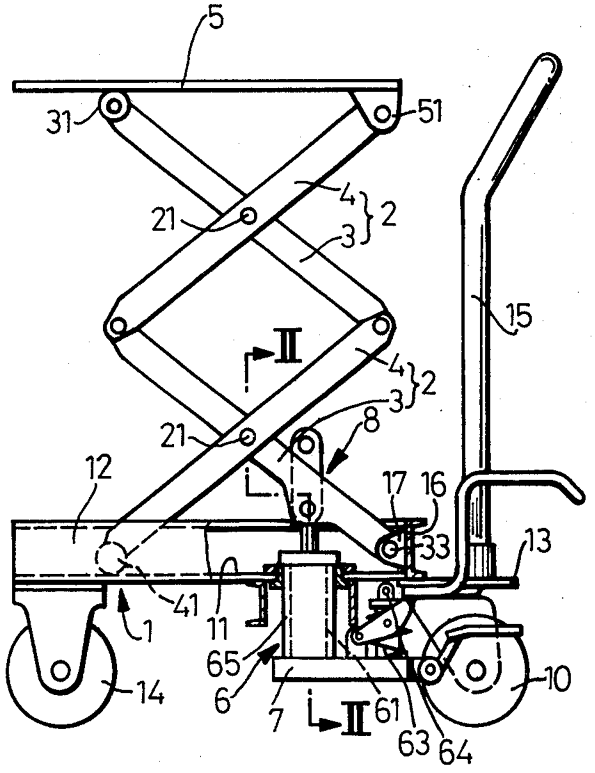
FIG. 1 is a front view showing a lifting device embodying this invention.
Figure 2:
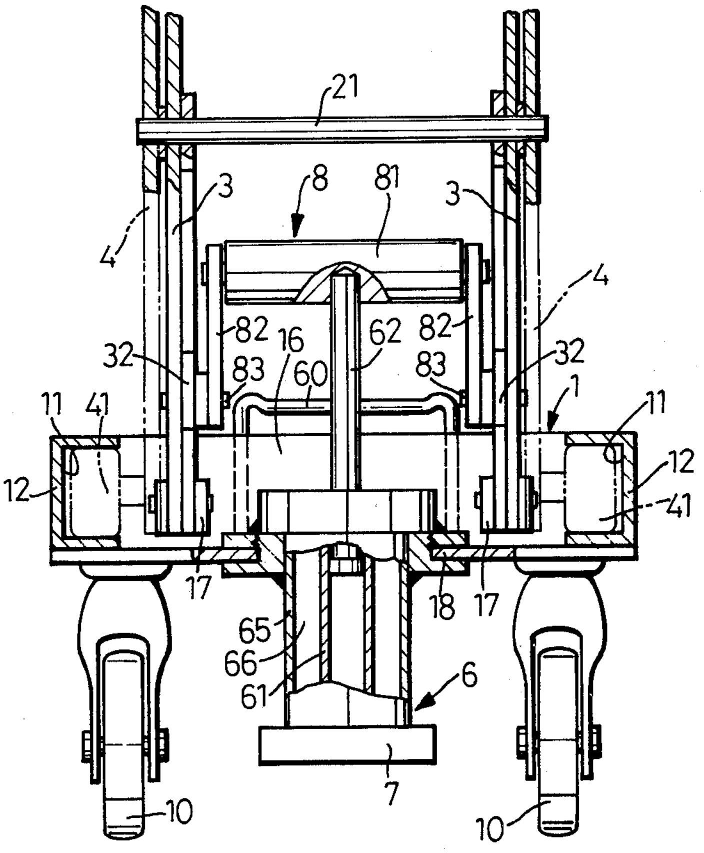
FIG. 2 is a view in section taken along the line II—II in FIG. 1.
Figure 6:
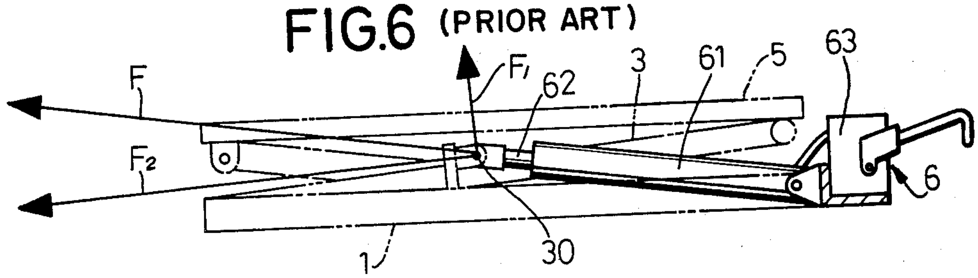
FIG.6 (PRIOR ART)
FIG. 6 is a diagram of the same to illustrate the force of a hydraulic cylinder as resolved into components.
Figure 3:
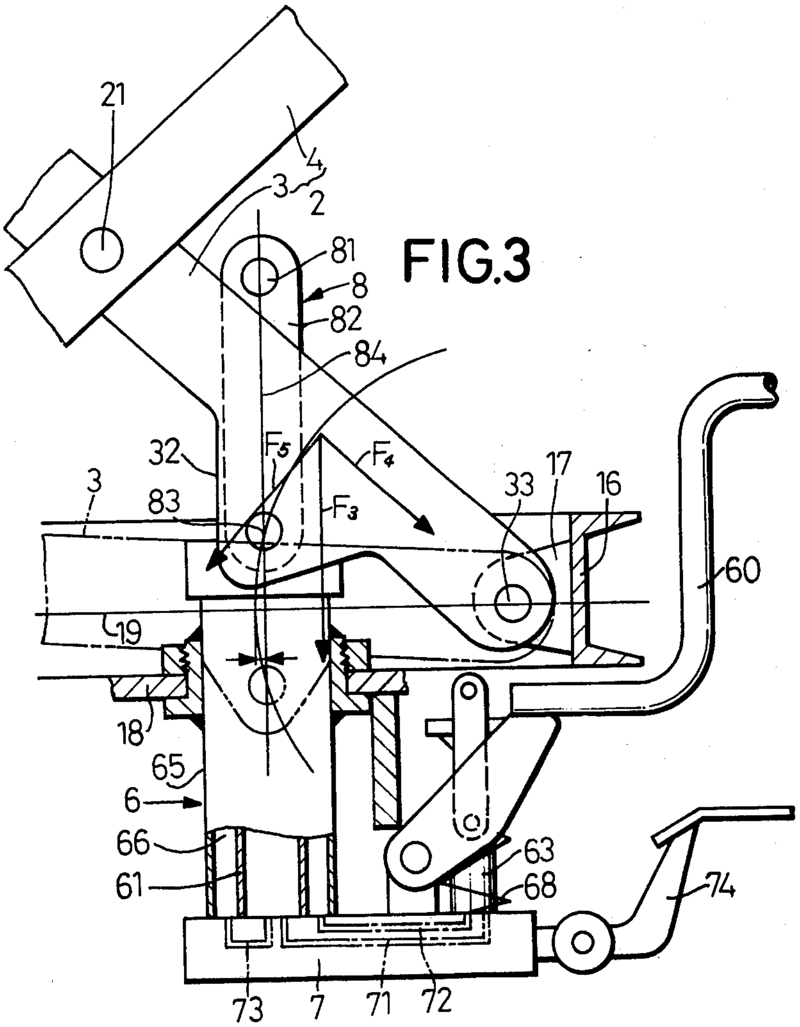
FIG. 3 is a front view showing a hydraulic assembly as installed in place.
Figure 5:
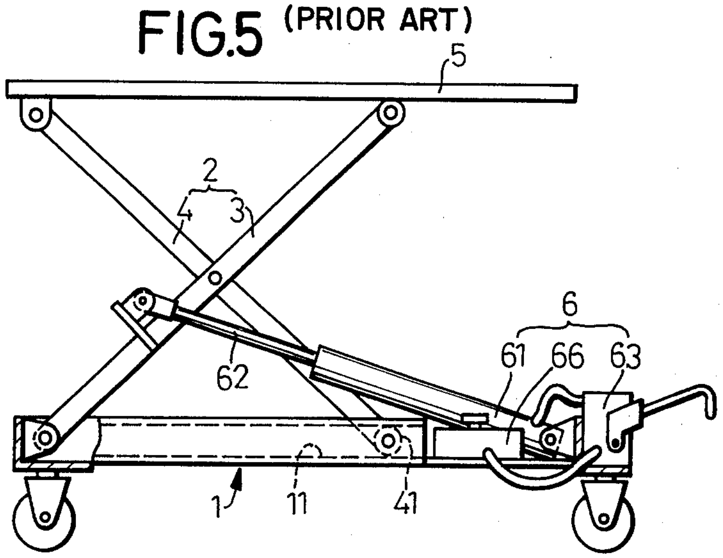
FIG.5 (PRIOR ART)
FIG. 5 is a front view showing a conventional device.

With reference to FIGS. 1 to 3, a lifting device includes a rectangular frame 1 made from channel members. Longitudinal channel members 12, 12 are opposed to each other with their channel portions facing each other as seen in FIG. 2 to provide guide portions 11, 11 in which rollers 41, 41 on the shiftable arms 4, 4 to be described later fit.

The frame 1 is provided at its four corners with front wheels 14 and rear wheels 10. An upwardly extending handle bar 15 is removably attached to a support plate 13 carrying the rear wheels 10, 10.

The frame 1 has a rear wall 16 formed with inwardly projecting brackets 17, 17 close to its opposite ends. A pair of arms 3, 3 pivotally movable in a vertical plane are pivoted at their lower ends to the brackets.

Each of shiftable arms 4, 4 having the same length as the pivotable arms 3, 3 intersects at its midportion the midportion of the corresponding one of the arms 3, 3. The arms 3 and 4 are connected together by a pivot 21 at the intersection. The rollers 41, 41 on the lower ends of the shiftable arms 4, 4 are rollably fitted in the guide portions 11, 11 at opposite sides of the frame 1 respectively. The resulting arrangement serves as a stretchable assembly 2 which is vertically expandable or collapsible.

A table 5 mounted on the stretchable assembly 2 is rectangular and approximately identical with the frame 1 in width and length. The table 5 has at its rear end side portions downwardly projecting brackets 51, 51 to which the shiftable arms 4, 4 are pivoted at the upper ends thereof. The table 5 bears on rollers 31, 31 mounted on the upper ends of the pivotable arms 3, 3.

A support piece 32 downwardly extends from each of the pivotable arms 3, 3 approximately midway between the pivot 21 and the lower end of the arm 3 as seen in FIG. 3. A hydraulic assembly 6 fixedly mounted on the frame 1 and positioned close to its rear wall 16 is coupled to the support pieces 32.

The hydraulic assembly 6 comprises a cylinder 61, a hydraulic pump 63 and an oil tank 66 disposed on a base plate 7 and assembled into a unit. The cylinder 61 has a piston rod 62 vertically projectable from and retractable into the cylinder and is liquid-tightly covered with a case 65. The oil tank 66 is provided between and defined by the inner surface of the case 65 and the cylinder 61. Lateral bars 18, 18 attached to a rear bottom portion of the frame 1 fixedly support an upper portion of the case 65 therebetween.

The cylinder 61, the case 65 and hydraulic pump 63 are fixedly arranged on the base plate 7 which is internally formed with oil channels 71, 72.

The oil tank 66 is in communication with the pump 63 via the oil channel 72 which is provided with a check valve (not shown) for permitting the passage of oil only from the tank 66 to the pump 63. The cylinder 61 communicates with the pump 63 through the oil channel 71 provided with a check valve (not shown) for permitting the flow of oil only from the pump 63 to the cylinder 61.

As shown in FIGS. 2 and 3, the piston rod 62 is fixed at its forward end to a lateral rod 81 with a pair of links 82, 82 pivoted to opposite ends of the rod 81. The lower ends of the links 82, 82 are pivoted as at 83 to the support pieces 32 of the pivotable arms 3, 3 to provide a link assembly 8. The pump 63 is coupled to a pedal 60 and a plunger 64 which is biased upward by a spring 68. When the plunger 64 is forced down by the pedal 60 against the action of the spring 68, the working oil in the pump 63 flows into the cylinder 61 and raises the piston rod 62, turning the pivotable arms 3 upward about the pivoted points 33.

The base plate 7 has another oil channel 73 for holding the cylinder 61 in communication with the oil tank 66 by way of a valve (not shown), which is openable by a lowering pedal 74 disposed to the rear of the base plate 7 to return the oil from the cylinder 61 to the oil tank 66 and lower the piston rod 62, whereby the pivotable arms 3, 3 can be turned downward.

The pivots 83 are so arranged that when the piston rod 62 is in its uppermost and lowermost positions during the above operation, the positions of the pivots 83 are on the same vertical line 84 shown in FIG. 3 and are upwardly and downwardly away from a horizontal line 19 through the lower end pivoted points 33 of the arms 3, 3 by the same distance.

The table 5 is lifted by operating the pedal 60 of the hydraulic assembly 6 and thereby progressively raising the piston rod 62 of the cylinder 61.

The pivotable arms 3, 3 coupled to the piston rod 62 by the link assembly 8 are upwardly turned about the base end pivoted point 33 so that the shiftable arms 4, 4 pivoted to the arms 3, 3 midway thereof are shifted with the lower end rollers 41, 41 rolling along the guide portions 11, 11 of the frame 1, thus expanding the stretchable assembly 2 upward to lift the table 5 on the assembly 2. When the hydraulic assembly 6 is operated with the table 5 positioned in its lowermost position, the piston rod 62 pushes up the pivotable arms 3 in an approximately horizontal position against the downward component of the load acting on the arms 3. Consequently the pushing force of the piston 62 can be used effectively. This permits the use of a small cylinder, while the pump 63 for feeding the working oil to the cylinder 62 is operable with ease.

As seen in FIG. 3, the downward force $F_3$ acting on the pivotable arms 3 can be resolved into a component $F_5$ acting in a tangent direction to turn the pivotable arms 3 downward and a component $F_4$ pushing the arms 3 toward the base ends of the arms 3. With the upward turn of the arms 3, the proportion of the component pushing the arms 3 towards their base ends increases and consequently reducing the component needed for turning the arms 3 to render the pump 63 operable progressively more easily.

Furthermore since the pivots 83 for connecting the pivotable arms 3 to the link assembly 8 are set to position on the same vertical line 84 when the piston rod 62 is in its uppermost and lowermost positions, this minimizes the range of swing, of the links 82 which shift about the lateral rod 81 of the link assembly 8 with the circular arc motion of the pivots 83. Consequently the upward force of the piston rod 62 can be effectively converted to a force for turning the pivotable arms 3, while the force acting to laterally deviate the piston rod 62 can be minimized.

The table 5 is lowered by forcing down the lowering pedal 74 of the hydraulic assembly 6 and thereby returning the oil from the cylinder 61 to the oil tank 66 to lower the piston rod 62 and downwardly collapse the stretchable assembly 2.

The cylinder 61 of the hydraulic assembly 6 may be slightly inclined forward or rearward relative to the frame 1 so as to position the piston rod 62 at right angles with the arms 3 when starting lifting the table and to give an increased raising force.

Figure 4:
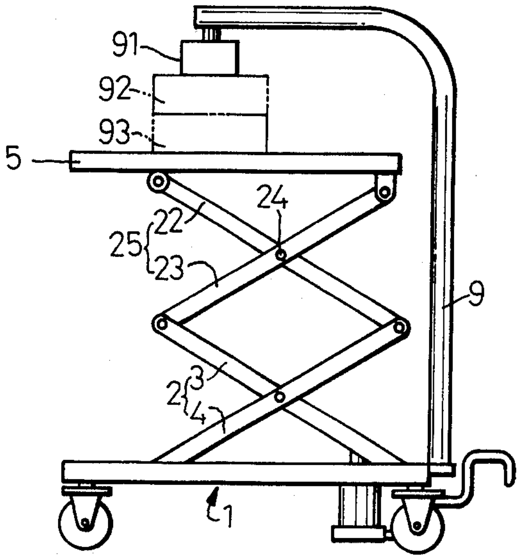
FIG. 4 is a front view showing another embodiment.

FIG. 4 shows another embodiment of the invention in which the upper ends of the pivotable arm 3 and the shiftable arm 4 of the stretchable assembly 2 are pivoted to the base ends of pantograph arms 23, 22 intersecting each other at their midportions. The arms 22, 23 are pivoted to each other at the intersection to provide a stretchable assembly 25. A table 5 is mounted on the assembly 25 and can be raised by a stroke of the same cylinder as above to an uppermost position which is about twice as high as that of the table 5 on the single stretchable assembly 2.

The frame 1 of the device has a post 9 extending from one end thereof and having an upper portion bent toward a position above the table 5. The forward end of the post 9 has an engaging member 91, such as a magnet, hook or the like, for suspending a workpiece 92 placed on the table 5.

The engaging member 91 is used, for example, for assembling two workpieces 92 and 93, such as a male die and a female die in combination. For this purpose, the workpiece 92 is placed on the table 5, raised and suspended from the engaging member 91. The table 5 is then lowered. The other workpiece 93 is thereafrer placed on the table 5, raised and fitted to the suspended workpiece 92 from below.

According to the present invention, the hydraulic assembly 6 comprises a cylinder 61, hydraulic pump 63 and hydraulic tank 66 arranged on a base plate 7 and assembled into a unit, which is fixedly mounted on the frame 1 with its piston rod 62 adapted to push up the arms 3 on the pivoted side approximately vertically. Accordingly the hydraulic unit 6 is mountable in place irrespective of the size of the frame 1, namely of the size of the table lifting device.

For this reason, there is no need to use a hydraulic pump and cylinder of particular size for each of table lifting devices provided in several different sizes. Thus standardized hydraulic units are usable for such lifting devices of varying sizes.

According to the invention, the piston rod 62 of the unitary hydraulic assembly 6 fixed to the frame 1 is adapted to project or retract from the cylinder substantially vertically to cause the force of he piston rod to act effectively on the pivotable arms 3 to turn the arms 3. This makes it possible to use a small cylinder and renders the pump 63 easily operable for feeding the working oil to the cylinder.

Because hydraulic units of the same standardized size are usable for table lifting devices which differ in overall size, the devices are suited to mass production and can be manufactured at reduced costs.

When the device is provided with a post 9 equipped with an engaging member 91, a workpiece 92 on the table 5 can be suspended temporarily from the engaging member 91. The device is then convenient for assembling two workpieces 92 and 93. The present device therefore has various advantages.

I claim:

1. A device for lifting a table comprising:

a frame having an upwardly extending handle bar, a stretchable assembly of intersecting pivotable arms and shiftable arms pivoted to each other at their intersection, and further stretchable assembly connected to the upper portion of the said stretchable assembly, lower ends of the pivotable arms of the lower stretchable assembly being pivotably attached to the frame and lower ends of the shiftable arms being slidably supported on the frame, the table being mounted on the upper ends of the arms of the upper stretchable assembly, a hydraulic assembly comprising a piston rod, a piston attached thereto, a cylinder housing the piston for advancing and retracting the piston rod, a pump for feeding working oil to the cylinder operatively associated with the cylinder, an oil tank connected to the pump, a base plate fixedly mounting the cylinder, pump and tank, the base plate and the cylinder being fixed rigidly to the frame near to the handle bar, the piston rod projecting substantially vertically from the cylinder and having a forward end, the cylinder being surrounded by a case and the oil tank being formed between the cylinder and the case, the pump being coupled to a pedal in order to operate the pump by foot, means for interconnecting said pump to said cylinder, said cylinder to said oil tank, and said oil tank to said pump, said means consisting of oil channels internally formed exclusively in said base plate, and a link assembly comprising a lateral rod connected to the forward end of the piston rod, and a pair of parallel links pivotally connecting both ends of the lateral rod to portions of the pivotable arms between their lower ends and the intersection, the piston rod intersecting the arms of the stretchable assembly at right angles thereto when the stretchable assembly is in a collapsed position.

* * * * *